Aug. 23, 1949.       D. O. TURNER       2,479,651
MACHINE FOR MUCKING VERTICAL SHAFTS
Filed April 1, 1947       6 Sheets-Sheet 1

Fig. 1

INVENTOR
Dewey O. Turner
Clarence F. Poole
Attorney

Aug. 23, 1949. D. O. TURNER 2,479,651
MACHINE FOR MUCKING VERTICAL SHAFTS
Filed April 1, 1947 6 Sheets-Sheet 3

Aug. 23, 1949.

D. O. TURNER 2,479,651

MACHINE FOR MUCKING VERTICAL SHAFTS

Filed April 1, 1947

INVENTOR
Dewey O. Turner
Clarence F. Poole
Attorney

Aug. 23, 1949.                D. O. TURNER                 2,479,651
                    MACHINE FOR MUCKING VERTICAL SHAFTS
Filed April 1, 1947                                    6 Sheets-Sheet 6

Patented Aug. 23, 1949

2,479,651

UNITED STATES PATENT OFFICE 2,479,651

MACHINE FOR MUCKING VERTICAL SHAFTS

Dewey O. Turner, Ava, Mo., assignor of one-tenth to Goodman Manufacturing Company, Chicago, Ill., a corporation of Illinois Application April 1, 1947, Serial No. 738,709

6 Claims. (Cl. 214—90)

This invention relates to improvements in machines for mucking vertical shafts.

One of the most difficult jobs in mining is shaft sinking and while various types of machines have been provided to facilitate the operation of sinking a shaft, very little has been done towards improving the method of removing the muck from the bottom of the shaft. This mucking operation has heretofore been done chiefly by hand and is the most laborious job in mining. Scrapers operated by hoists and clam shell buckets operated from a movable stage or platform in the shaft, have been used in recent years in an attempt to mechanize the mucking operation, but with the exception of the clam shell bucket none of these attempts to mechanize shaft mucking has been satisfactory, and the clam shell bucket is not entirely satisfactory for mucking rock unless the rock is broken into such small pieces that it can easily be picked up by the claim shell.

The principal objects of my invention are to remedy these difficulties by providing a novel, simplified, and efficient machine and method for mucking vertical shafts.

These and other objects of my invention will appear from time to time as the following specification proceeds and with reference to the accompanying drawings wherein.

In the embodiment of my invention illustrated in the drawings the shaft mucker includes generally a main frame 10 having a relatively flat bottom 11 adapted to rest directly on the shaft floor and having an upright rear end 12 with vertically spaced wide transversely extending abutment bars 13, 13 adapted to abut a rib or wall 14 of the mine shaft and form a reaction means for said mucking machine during the crowding of a dipper 15 on the forward end of a boom 16, into the material it is desired to pick up.

The dipper 15 and boom 16 are mounted on a carriage 17 which is slidably guided in the main frame 10 for extensible and retractible movement with respect thereto. As herein shown, said carriage includes a pair of parallel spaced longitudinally extending channels 18, 18 guided in bearing plates indicated generally by reference characters 19, 19 and mounted on the insides of facing channelled guides 20, 20 which extend along the inside of said main frame. Said channels 18, 18 are connected together by suitable cross connecting bracing members 21, 21 spaced therealong and by a supporting frame member 22 adjacent the forward end of said frame, which forms a support for a vertically extending mast 23 and also forms a platform for a bucket 24 adapted to receive the muck discharged from said dipper and to carry the muck to the top of the shaft for disposal.

The mast 23 forms a stop for the dipper 15 and boom 16 when at the upper end of their path of travel and has two pairs of parallel laterally spaced guide rollers 25, 25 mounted adjacent its upper end, for rotation about vertical axes. Chains 26, 26 extend between each of said pairs of rollers, and are connected with said dipper at their free ends, for operating said dipper in a manner similar to that shown and described in Patent No. 1,514,008, which issued to J. P. Mosier on November 4, 1924. Said chains extend forwardly from independently operable winding drums 27, 27 between said guide rollers and over forwardly spaced horizontal rollers 28, 28 mounted on and extending in advance of said mast, and are connected at their forward ends to the rear ends of vertical side walls 29, 29 of said dipper 15 (see Figure 3).

Figure 1:
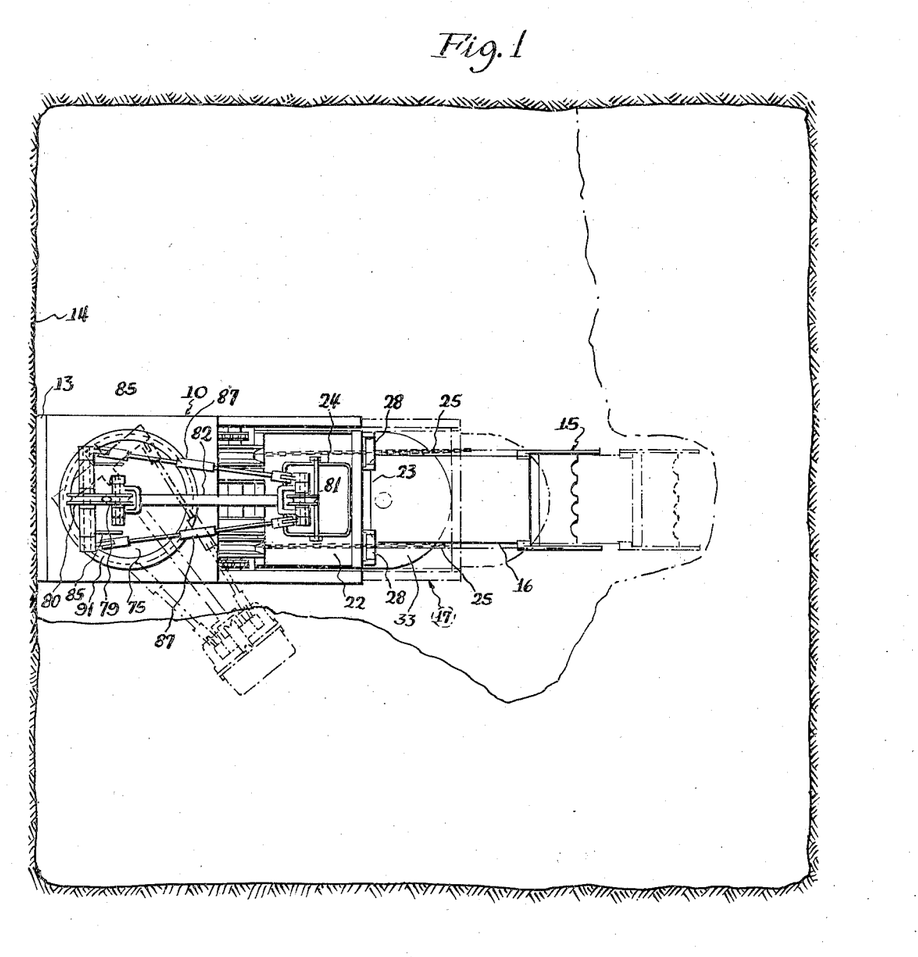
Figure 1 is a partial diagrammatic plan view showing a mucker constructed in accordance with my invention in the process of mucking out the bottom of a vertical shaft.
Figure 2:
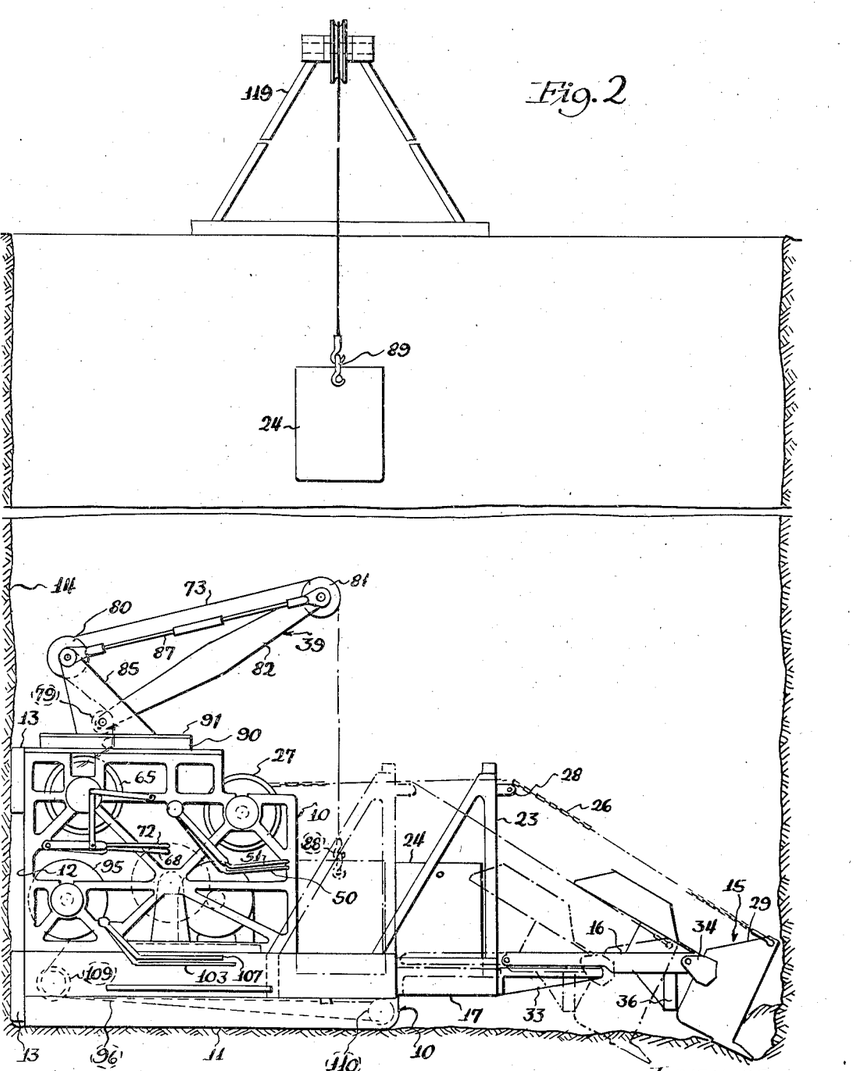
Figure 2 is a partial diagrammatic view in side elevation of the device shown in Figure 1, drawn to a larger scale than Figure 1 and showing the shovel in a fully extended position.
Figure 3:
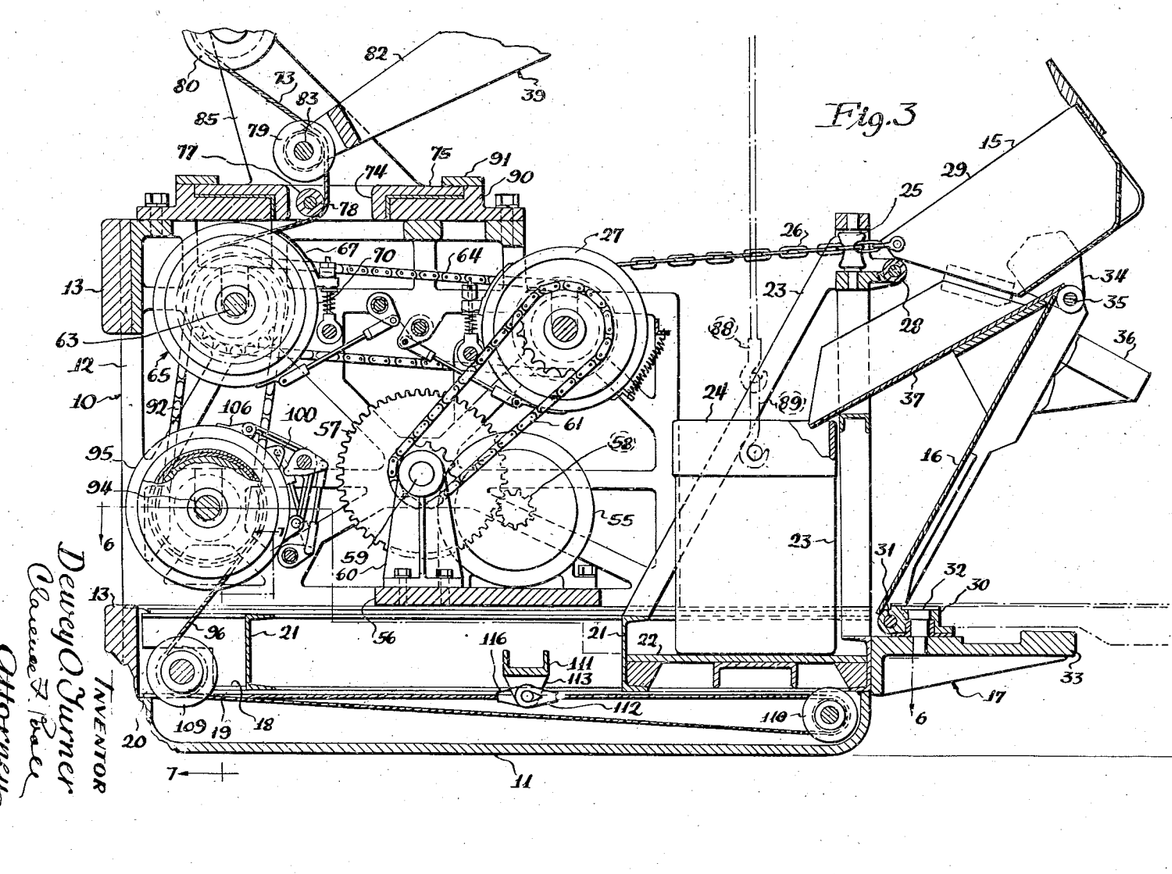
Figure 3 is an enlarged detail view in side elevation of the shaft mucker shown in Figure 1, with certain parts broken away and certain other parts shown in substantially longitudinal section.

The boom 16 is transversely pivoted to a hinge member 30 on a hinge pin 31 (see Figure 3). A vertical pin 32 pivotally mounts said hinge member on a forwardly projecting platform 33 at a point disposed just forwardly of the forward end of the mast 23. Said platform is secured to and extends forwardly from the forward end of the carriage 17, and forms a support for said boom when said boom is in a lowered position, as is shown in Figure 2.

The dipper 15 has a pair of laterally spaced ears 34, 34 disposed intermediate its ends and extending from the bottom thereof, which are pivotally connected to the forward end of the boom 16 by means of a transverse pin 35. An abutment member 36 depends from said boom adjacent its forward end and is adapted to abut the rear side of the dipper 15, when said dipper is in a lowered material engaging position. Said abutment member forms a stop for said scoop to limit backward travel thereof and forms a means for crowding said scoop into the material it is desired to load, upon extension of the carriage 17 from the main frame 10 when the abutment bars 13, 13 are in engagement with a wall of the mine shaft. An inclined chute 37 is mounted on said boom and extends rearwardly from the forward end thereof in a direction which is upwardly inclined, when said boom is in the lowered position shown in Figure 2. The angle of inclination of said discharge chute is such that the discharge end of the dipper 15 is in communication with said chute when said dipper is in the discharge position shown in Figure 3, and the discharge end of said chute is in communication with the bucket 24 for guiding material from said dipper to said bucket. Said bucket is herein shown as being of a rectangular form and may be removed from said carriage when full and placed to one side of said mucker, for removal from the mine shaft by means of a hoisting apparatus 39 mounted on the top of said mucker, as will hereinafter be more clearly described as this specification proceeds.

Figure 4:
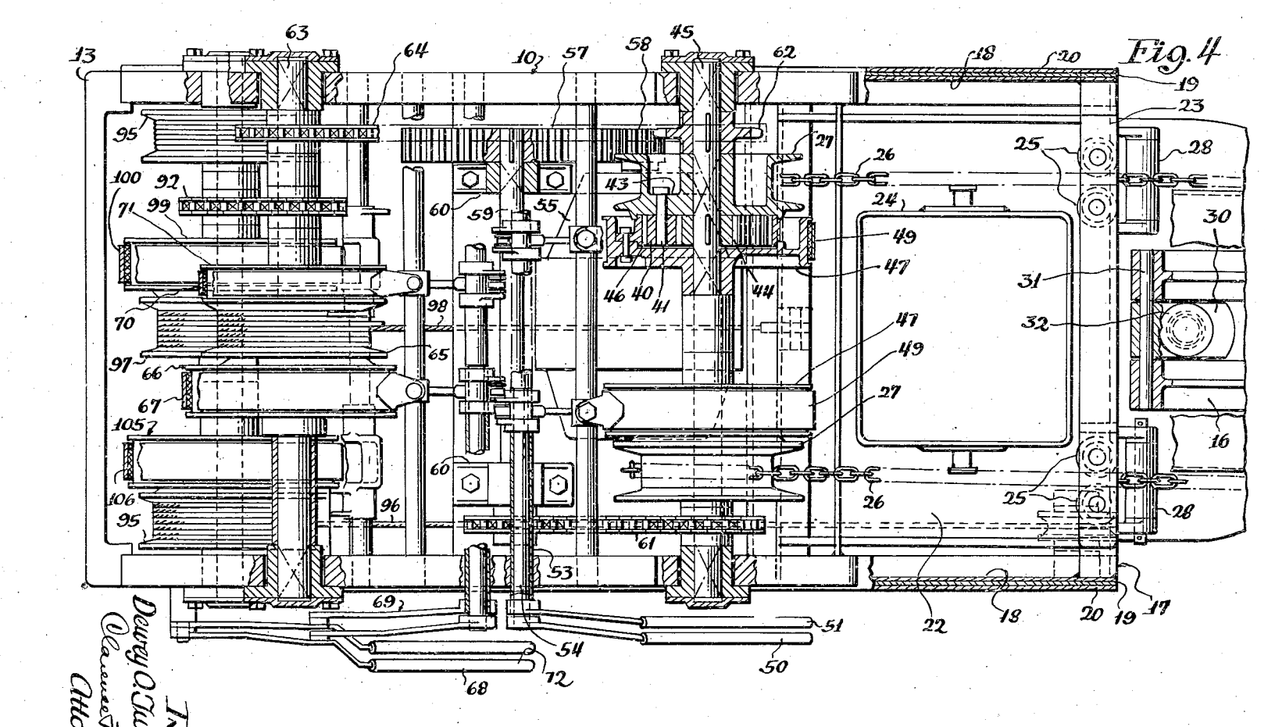
Figure 4 is a fragmentary plan view drawn to a slightly larger scale than Figure 3 and showing certain parts broken away and certain other parts in substantially horizontal section.
Figure 5:
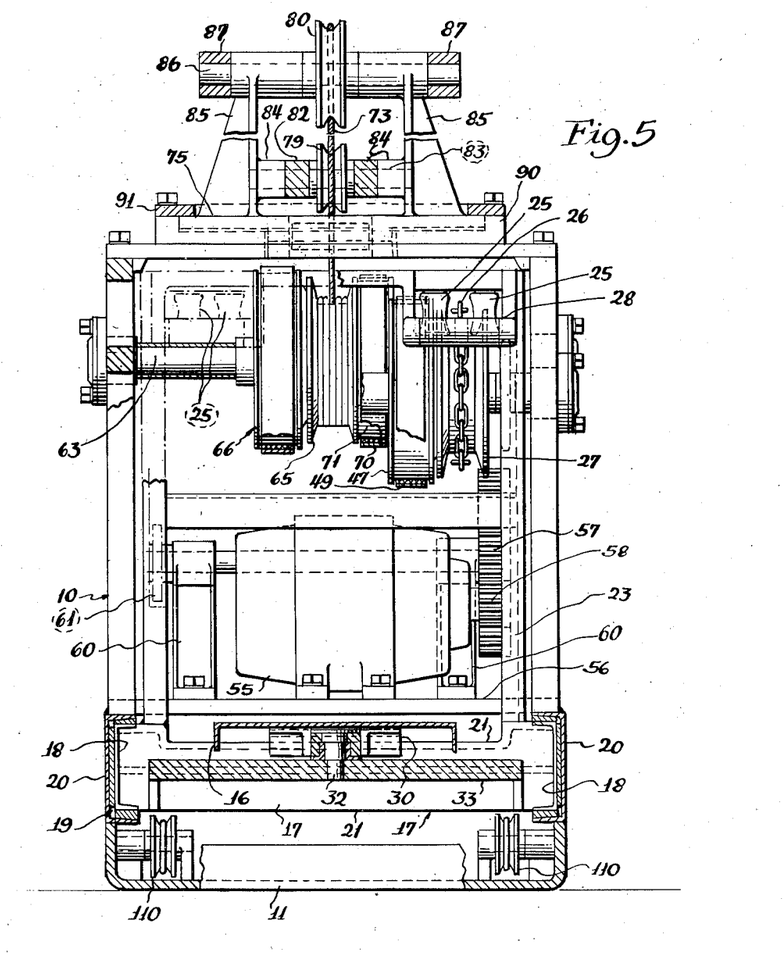
Figure 5 is a fragmentary front end view of the shaft mucker showing the carriage for the dipper and boom in transverse section, taken through the vertical pivot point for the boom, and showing certain other parts broken away and in transverse section.

Each winding drum 27 has a plurality of planetary pinions 40, 40 mounted thereon for free rotation with respect thereto on transverse shafts 41, 41 (see Figure 4). Said shafts 41, 41 are mounted on and extend outwardly of a side wall 43 of said drum. Said planetary pinions mesh with and are driven from a sun gear 44 keyed to a transverse shaft 45 journaled at its ends in opposite side walls of the main frame 10 and having said drums journaled thereon. Said planetary pinions also mesh with an internal gear 46 secured to the inside of a drum 47, which is mounted on said transverse shaft for free rotation with respect thereto. A friction band 49 is adapted to engage said drum to hold said drum from rotation and cause said winding drum to be driven from said transverse shaft at a reduced speed.

The right- and left-hand friction bands 49, 49 for the planetaries just described are operated by separate hand levers 50, 51, one of said hand levers being mounted on a sleeve 53 for operating one of said friction bands and holding one of said internal gears from rotation, and the other of said hand levers being mounted on a transverse shaft 54 coaxial with said sleeve, for operating the other of said hand levers and holding the other of said internal gears from rotation. The operative connection between said sleeve and said transverse shaft and said friction bands for independently operating said friction bands may be of any well known form and is no part of my present invention so is not herein shown or described in detail.

The transverse shaft 45 is driven from a motor 55 mounted on said main frame on a transverse plate 56 extending across said main frame adjacent its forward end and resting on the upper flanges of the channels of the channelled guides 20, 20. The drive connection from said motor to said shaft includes a spur gear 57 meshed with and driven from a motor pinion 58 and mounted on a transverse shaft 59 journaled in laterally spaced bearing supports 60, 60 mounted on and extending upwardly from said plate 56. A chain and sprocket drive 61 connects said shaft 59 with said shaft 45.

A sprocket 62 is keyed adjacent the opposite end of the transverse shaft 45 from the chain and sprocket drive 61 and drives a rearwardly spaced parallel transverse shaft 63 through a chain and sprocket drive 64. Said last mentioned transverse shaft has a winding drum 65 freely mounted thereon and forming the winding means for the hoisting apparatus 39. Said winding drum is selectively driven from said shaft by means of a planetary geared reduction device 66, similar to the planetary geared reduction devices which serve to selectively drive the winding drums 27, 27 from the transverse shaft 45 and no part of my present invention so not herein shown or described in detail. A friction band 67 is provided to control operation of said planetary geared reduction device and is engaged therewith to hold the internal gear (not shown) of said planetary geared reduction device from rotation by means of a hand lever 68 operatively connected with said friction band through a suitable system of links and levers indicated generally by reference character 69. A brake band 70 engageable with a flange 71 projecting from the side of said drum opposite from said planetary is provided to hold said winding drum 65 from rotation. A hand lever 72 movable about an axis coaxial with the pivotal axis of the hand lever 68 is provided to apply said brake band to said flange and hold said hoisting drum from rotation.

A cable 73 is wound on the winding drum 65 and extends therefrom upwardly through an opening 74 in a base plate 75 of said hoisting apparatus. From thence said cable extends upwardly under a roller 77 on a transverse shaft 78 mounted within said opening. Said cable extends upwardly from said roller and partially around and angularly upwardly and rearwardly from an idler 79, to and around a vertically spaced idler 80 and forwardly from said idler to and around an idler 81 on the forward end of a boom 82, and downwardly from said idler. Said idler 79 is journaled on a transverse shaft 83 mounted at its ends in bosses 84, 84 extending inwardly from upright brackets 85, 85 projecting upwardly from said base plate. Said brackets have a transverse shaft 86 mounted therebetween, which has said idler 80 journaled thereon. The boom 82 is pivotally mounted at its rear end on the transverse shaft 83 on opposite sides of the idler 79. Adjustable tie rods 87, 87 are connected between the outer end of said boom and the ends of the transverse shaft 86, for holding said boom in the desired position. A hook 88 on the free end of said cable may be hooked to a bail 89 of the bucket 24 for removing said bucket from said carriage and placing it to one side of the machine where it may be removed from the shaft.

The base 75 is rotatably mounted on a plate 90 extending across opposite side frame members of the main frame 10, and is retained on said plate by means of a retaining ring 91 secured to the top of said plate and abutting the top of said base.

Figure 6:
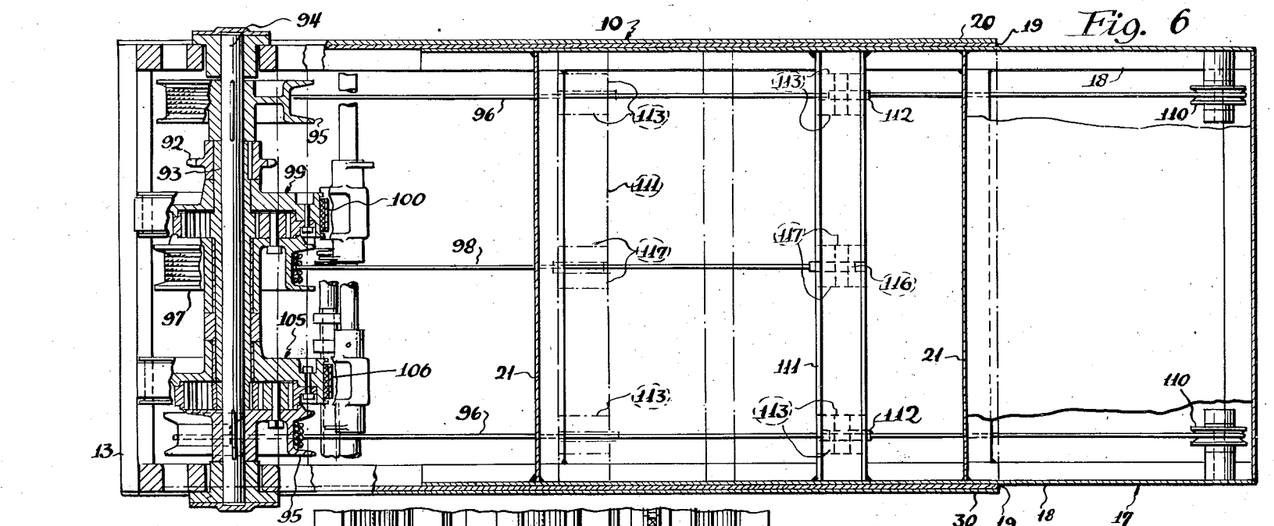
Figure 6 is an enlarged fragmentary horizontal sectional view taken substantially along line 6—6 of Figure 3.
Figure 7:
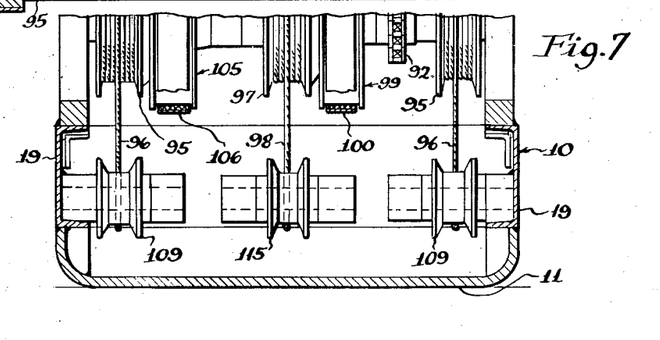
Figure 7 is an enlarged fragmentary transverse sectional view taken substantially along line 7—7 of Figure 3.

A chain and sprocket drive 92 connects the transverse shaft 63 with a sleeve 93 (see Figures 3 and 6). Said sleeve is rotatably mounted on a transverse shaft 94 journaled at its ends in opposite side frame members of the main frame 10. Winding drums 95, 95 are keyed on said shaft adjacent the inner sides of said side frame members. Each of said winding drums is adapted to have a flexible cable 96 wound thereon for extending the carriage 17 and the dipper 15 and boom 16 from said main frame, as will hereinafter more clearly appear. A winding drum 97 is freely mounted on the sleeve 93 intermediate the ends of said sleeve and has a cable 98 wound thereon which is adapted to retract said carriage within said main frame, upon the winding in of said cable.

The winding drum 97 freely mounted on the sleeve 93 is driven from said sleeve by means of a planetary geared reduction device 99 similar to the planetary geared reduction devices which drive the winding drums 27, 27, so not herein described in detail. Said planetary is controlled by a friction band 100 operated from a hand lever 103 on the outer side of the right-hand side wall of the main frame 10, beneath the hand levers 50 and 51 (see Figure 2), through a suitable system of links and levers which are not herein shown or described since they are no part of my present invention.

The transverse shaft 94 is driven from the right-hand drum 95, which drum is driven from the sleeve 93 through a planetary geared reduction device 105 similar to the planetary geared reduction device 99. Said planetary geared reduction device is controlled by a friction band 106 through a hand lever 107 mounted coaxial with the hand lever 103. A suitable system of links and levers operatively connect said hand lever 107 with said friction band to apply said friction band and cause the two winding drums 95, 95 to be simultaneously driven from the sleeve 93.

The flexible cables 96, 96 are herein shown as being trained forwardly over the tops of the winding drums 95, 95 and downwardly and angularly rearwardly therefrom, and around idler sheaves 109, 109 mounted in the main frame 10 adjacent the rear lower end thereof. From thence said cables extend forwardly to and around idler sheaves 110, 110 mounted adjacent the forward lower end of said main frame and rearwardly therefrom to an intermediate transversely extending channel 111 of the carriage 17. Said cables each have a connecting member 112 secured to their free ends which are pivotally connected between depending ears 113, 113 depending from the bottom of said channel (see Figure 3). Thus when power is applied to the winding drums 95, 95 in a direction to wind cable thereon, the carriage 17 will be extensibly moved from said main frame, to extend the dipper 15 to pick up loose material remote from said main frame, and to crowd said dipper into the material it is desired to load.

The cable 98 trained from the winding drum 97 extends downwardly therefrom, to and around an idler sheave 115 journaled adjacent the rear lower end of the main frame 10 and forwardly from said idler to the channel 111. A connecting member 116 on the free end of said cable extends between connecting ears 117, 117 depending from the bottom of the central portion of said channel, and is pivotally connected to said ears.

Referring now to the method of mucking of my invention, during the shooting operation the machine may either be removed from the shaft or placed on a staging or platform mounted in the shaft above the bottom of the shaft. In shooting it is desirable that the bottom of the shaft be so shot that the loose rock will be piled up along one side of the shaft. After the shooting operation the mucking machine may be lowered by a hoist at the top of the shaft, shown diagrammatically in Figure 2 and indicated generally by reference character 119. Said hoist may set the mucking machine on the low part of the shaft bottom adjacent one side thereof, with the abutment bars 13, 13 abutting a shaft wall 14 so the dipper 15 may readily get at the piled up rock and the crowding reactions will be taken against the shaft wall. The mucking operation starting adjacent one corner of the shaft, the dipper and boom may be raised and lowered and moved from side to side to pick up the broken down rock and muck and load it into the bucket 24 by operation of the drums 27, 27 controlled by the hand levers 50 and 51 in a well known manner. Said dipper may be crowded into the muck and rock by extensible movement of the carriage 17 with respect to the main frame 10, the thrust of digging being taken against the shaft wall 14 by the abutment bars 13, 13. As the bucket 24 is filled, the hoisting apparatus 39 may remove it from the carriage 17 and place it to one side of the machine, and replace the full bucket with an empty bucket, the hoist 119 on the top of the shaft taking the loaded buckets from the shaft and lowering empty buckets to the mucker. In order to facilitate the mucking operation a number of empty buckets may be provided and lowered into the shaft and placed beside the mucker to assure a continuous supply of buckets thereto and to avoid delay while the hoist 119 is removing filled buckets from the shaft and returning empty buckets to the mucker. After the portion of the shaft in the range of the dipper 15 has been entirely mucked out or cleaned up, the machine may be lifted by the hoist 119 and placed in a new position in the shaft with its rear end abutting the shaft wall, to clean up another portion of the shaft bottom within the full range of said dipper. This operation may be repeated with the rear end of the machine abutting a shaft wall in each new position of said mucker, to take the crowding thrusts until the entire shaft has been mucked out, at which time the mucker may be hoisted to a platform or staging above the bottom of the shaft, or entirely out of the shaft to permit the shaft bottom to again be shot and prepared for another mucking operation.

It may be seen from the foregoing that a simplified method and machine has been provided for efficiently mucking shaft bottoms and that the machine used to carry out the method rests on its bottom on the shaft bottom to provide utmost stability for the machine and reacs against a wall of the shaft which takes the thrusts of crowding the dipper into the material it is desired to pick up.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a shaft mucking machine, a main frame adapted to rest on a shaft bottom on its own bottom and to react against a wall of the shaft during operation, a carriage mounted on said main frame for movement therealong, a boom pivoted to said carriage for movement about a vertical and a horizontal axis and resting on said carriage when in a lowered position, a dipper transversely pivoted to the end of said boom, a bucket mounted on said carriage adjacent the discharge end of said dipper, guide means on said boom for guiding material from said dipper to said bucket, and selectively operable power operated means on said main frame and operatively connected with said carriage for moving said carriage with respect to said main frame for crowding said dipper into the material it is desired to load while the rear end of said main frame reacts against a shaft wall.

2. In a shaft mucking machine, a main frame adapted to rest on a shaft bottom on its own bottom and to react against a wall of the shaft during operation, a carriage guided for slidable movement along said main frame and for extension therefrom, a boom mounted on said carriage for movement about a vertical and a transverse axis and resting on said carriage when in a lowered position, a dipper transversely pivoted on the end of said boom, a bucket receiving platform on said carriage disposed rearwardly of said boom, a removable bucket adapted to rest on said platform in material receiving relation with respect to said dipper, a hoist mounted on said frame for removing a loaded bucket from said carriage and for replacing an empty bucket in said carriage, selectively operable power operated means mounted on said main frame and operatively connected with said carriage for extending said carriage from said main frame for crowding said dipper into the material it is desired to load, and abutment plates on the rear end of said main frame adapted to abut the shaft wall and take the crowding reactions of said dipper during crowding of said dipper into the material it is desired to load by extension of said carriage from said main frame.

3. In a shaft mucking machine, a main frame adapted to rest on a shaft bottom on its own bottom and to react against a wall of the shaft during operation, a carriage guided for slidable movement along said main frame and for extension therefrom, a boom mounted on said carriage for vertical and horizontal swinging movement with respect thereto and resting on said carriage when in a lowered position, a dipper transversely pivoted on the end of said boom, a bucket receiving platform on said carriage and disposed rearwardly of said boom, a removable bucket adapted to rest on said platform in material receiving relation with respect to said dipper, a hoist mounted on said main frame for removing a loaded bucket from said platform and for replacing an empty bucket on said platform, a motor on said main frame, a winding drum on said main frame selectively driven by said motor, and a flexible member operatively connected with said winding drum and having operative connection with said carriage for extending said carriage from said main frame and crowding said dipper into the material it is desired to load while said main frame abuts and reacts against a side wall of the shaft being mucked.

4. In a shaft mucking machine, a main frame adapted to rest on a shaft bottom on its own bottom and to react against a wall of the shaft during operation, a carriage guided for slidable movement along said main frame and for extension therefrom, a boom mounted on said carriage for vertical and horizontal swinging movement with respect thereto and resting on said carriage when in a lowered position, a dipper transversely pivoted on the end of said boom, a bucket receiving platform on said carriage and disposed rearwardly of said boom, a removable bucket adapted to rest on said platform in material receiving relation with respect to said dipper, a hoist mounted on said frame for removing a loaded bucket from said platform and for replacing an empty bucket on said platform, a motor on said main frame, a plurality of oppositely rotating winding drums on said main frame, selective drive connections from said motor to said winding drums for selectively driving said drums, each of said winding members having a flexible member wound thereon and having operative connection with said carriage for extending said carriage with respect to said main frame and crowding said dipper into the material it is desired to load while said main frame abuts and reacts against a side wall of the shaft being mucked, and for withdrawing said carriage within said main frame.

5. In a shaft mucking machine, a main frame adapted to rest on a shaft bottom on its own bottom and to react against a wall of the shaft during operation, a carriage guided for slidable movement along said main frame and for extension therefrom, a boom mounted on said carriage for vertical and horizontal swinging movement with respect thereto and resting on said carriage when in a lowered position, a dipper transversely pivoted on the end of said boom, a bucket receiving platform on said carriage, a bucket adapted to rest on said platform in material receiving relation with respect to said dipper, a hoist mounted on said frame for removing full buckets from and replacing empty buckets on said platform, a motor on said main frame, selective drive connections from said motor to said hoist, two oppositely rotating winding drums on said main frame, selective drive connections from said motor to said winding drums for selectively driving said drums, and flexible members adapted to be wound on said winding drums and having operative connection with said carriage for extending said carriage from and retractibly moving said carriage within said main frame for crowding said dipper into the material it is desired to load, and an abutment plate on the rear end of said main frame adapted to abut and react against a wall of said shaft during extensible movement of said carriage and crowding movement of said dipper.

6. In a shaft mucking machine, a main frame adapted to rest on a shaft bottom on its own bottom and to react against a wall of the shaft during operation, a carriage guided for slidable movement along said main frame and for extension therefrom, a boom mounted on said carriage for vertical and horizontal swinging movement with respect thereto and resting on said carriage when in a lowered position, a dipper transversely pivoted on the end of said boom, a bucket receiving platform on said carriage, a bucket adapted to rest on said platform in material receiving relation with respect to said dipper, a hoist mounted on said frame for removing full buckets from and replacing empty buckets on said platform, a motor on said main frame, selective drive connections from said motor to said hoist, and means on said main frame and driven from said motor for extending said carriage from and retractibly moving said carriage within said main frame for crowding said dipper into the material it is desired to load while said main frame abuts and reacts aganst a wall of said shaft including a winding drum adjacent the lower rear end of said main frame, selective drive connections between said motor and said winding drum, a flexible member adapted to be wound on said winding drum and operatively connected with said carriage for retractibly moving said carriage with respect to said main frame, a plurality of winding drums arranged coaxially with said last mentioned winding drum and disposed on opposite sides thereof, selective drive connections from said motor to said drums for driving said drums in a winding direction, and flexible members adapted to be wound on said winding drums and operatively connected with said carriage for extensibly moving said carriage with respect to said main frame.

DEWEY O. TURNER.

REFERENCES CITED

The following references are of record in the file of this patent:

UNITED STATES PATENTS

| Number | Name | Date |
|---|---|---|
| 105,883 | Bailey | Aug. 2, 1870 |
| 1,665,378 | Peterson | Apr. 10, 1928 |
| 2,086,687 | Whitmire | July 13, 1937 |
| 2,157,736 | Dooley et al. | May 9, 1939 |
| 2,393,432 | Turner | Jan. 22, 1946 |
| 2,440,501 | Erickson | Apr. 27, 1948 |

FOREIGN PATENTS

| Number | Country | Date |
|---|---|---|
| 577,621 | Germany | June 2, 1933 |

OTHER REFERENCES

Bureau of Mines, "Information Circular I. C. 7425," January 1948. (Copy available in Div. 4.)